United States Patent
Pinarbasi

[19]

[11] Patent Number: 6,160,687
[45] Date of Patent: *Dec. 12, 2000

[54] METHOD OF PROVIDING IMPROVEMENT IN THE PREVENTION OF SHIELD-TO-LEAD SHORTS IN MR/GMR HEADS, MR/GMR HEADS PRODUCED THEREBY AND STORAGE DEVICES USING MR/GMR HEADS PRODUCED THEREBY

[75] Inventor: Mustafa Pinarbasi, Morgan Hill, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/087,469

[22] Filed: May 29, 1998

[51] Int. Cl.$^7$ ........................................................ G11B 5/39
[52] U.S. Cl. ................................................................ 360/322
[58] Field of Search ..................................... 360/113, 322

[56] References Cited

U.S. PATENT DOCUMENTS

| | | |
|---|---|---|
| 4,024,489 | 5/1977 | Bajorek et al. . |
| 4,918,554 | 4/1990 | Bajorek et al. . |
| 4,967,298 | 10/1990 | Mowry . |
| 5,079,831 | 1/1992 | Reid . |
| 5,446,613 | 8/1995 | Rottmayer . |
| 5,467,881 | 11/1995 | Gill ........................................... 216/22 |
| 5,557,492 | 9/1996 | Gill et al. ................................ 360/113 |
| 5,568,335 | 10/1996 | Fontana et al. ......................... 360/113 |
| 5,585,986 | 12/1996 | Parkin . |
| 5,617,277 | 4/1997 | Chen et al. .............................. 360/113 |
| 5,621,592 | 4/1997 | Gill et al. . |
| 5,666,248 | 9/1997 | Gill . |
| 5,668,689 | 9/1997 | Schultz et al. . |
| 5,764,446 | 6/1998 | Seagle ..................................... 360/113 |
| 5,850,324 | 12/1998 | Wu et al. ................................. 360/113 |
| 5,978,183 | 11/1999 | Hsiao et al. ............................. 360/113 |

FOREIGN PATENT DOCUMENTS

7-244818  9/1995  Japan .

*Primary Examiner*—William Klimowicz
*Attorney, Agent, or Firm*—Altera Law Group, LLC

[57] ABSTRACT

A method of providing improvement in the prevention of shield-to-lead shorts in MR/GMR heads is disclosed. A sensor in accordance with the principles of the present invention includes an MR sensor, a lead, the lead being electrically coupled to the MR sensor on opposite sides of the MR sensor and forming a single path to and from the MR sensor, an insulation layer only over the lead, and a gap layer formed over the MR sensor and the insulation layer, wherein the insulation layer has a thickness independent of the thickness of the gap layer. The lead may include a first lead portion electrically coupled to the MR sensor on opposite sides of the MR sensor and forming a single path to and from the MR sensor and a second lead portion, the second lead portion terminating at a distance from the MR sensor. The insulator layer is of a thickness in the range of substantially 100 to 500 angstroms. The first and second lead portions form a composite lead, the composite lead having a first thickness comprising only the first lead portion and a second thickness comprising the first and second lead portions, the first thickness located proximate the MR sensor, the second thickness being thicker than the first thickness and formed at a distance from the MR sensor. The second lead portion includes a geometry selected to optimize the composite lead for resistivity and manufacturability.

21 Claims, 4 Drawing Sheets

METHOD OF PROVIDING IMPROVEMENT IN THE PREVENTION OF SHIELD-TO-LEAD SHORTS IN MR/GMR HEADS, MR/GMR HEADS PRODUCED THEREBY AND STORAGE DEVICES USING MR/GMR HEADS PRODUCED THEREBY

BACKGROUND OF THE INVENTION

1. Field of the Invention

This invention relates in general to a thin film magnetic head assemblies, and more particularly to a method of providing improvement of shield-to-lead shorts in MR/GMR heads.

2. Description of Related Art

In a disk drive the MR head is mounted on a slider which is connected to a suspension arm, the suspension arm urging the slider toward a magnetic storage disk. When the disk is rotated the slider flies above the surface of the disk on a cushion of air which is generated by the rotating disk. The MR head then plays back recorded magnetic signals (bits) which are arranged in circular tracks on the disk.

The MR sensor is a small stripe of conductive ferromagnetic material, such as Permalloy (NiFe), which changes resistance in response to a magnetic field such as magnetic flux incursions (bits) from a magnetic storage disk. The conventional MR sensor operates on the basis of the anisotropic magnetoresistive (AMR) effect in which a component of the read element resistance varies as the square of the cosine of the angle between the magnetization in the read element and the direction of sense current flowing through the read element. Recorded data can be read from a magnetic medium because the external magnetic field from the recorded medium (the signal field) causes a change in the direction of magnetization in the read element, which in turn causes a change in resistance in the read element and a corresponding change in the sensed current or voltage. Conventional MR sensors based on the AMR effect thus provide an essentially analog signal output, wherein the resistance and hence signal output is directly related to the strength of the magnetic field being sensed.

A different and more pronounced magnetoresistance, called giant magnetoresistance (GMR), has been observed in a variety of magnetic multilayered structures, the essential feature being at least two ferromagnetic metal layers separated by a nonferromagnetic metal layer. This GMR effect has been found in a variety of systems, such as Fe/Cr, Co/Cu, or Co/Ru multilayers exhibiting strong anti-ferromagnetic coupling of the ferromagnetic layers. This GMR effect has also been observed for these types of multilayer structures, but wherein the ferromagnetic layers have a single crystalline structure and thus exhibit uniaxial magnetic anisotropy, as described in U.S. Pat. No. 5,134,533 and by K. Inomata, et al., J. Appl. Phys. 74 (6), Sep. 15, 1993. The physical origin of the GMR effect is that the application of an external magnetic field causes a reorientation of all of the magnetic moments of the ferromagnetic layers. This in turn causes a change in the spin-dependent scattering of conduction electrons and thus a change in the electrical resistance of the multilayered structure. The resistance of the structure thus changes as the relative alignment of the magnetizations of the ferromagnetic layers changes. MR sensors based on the GMR effect also provide an essentially analog signal output.

In high density disk drives bits are closely spaced linearly about each circular track. In order for the MR head to playback the closely spaced bits the MR head has to have high resolution. This is accomplished by close spacing between the first and second shield layers, caused by thin first and second gap layers, so that the MR sensor is magnetically shielded from upstream and downstream bits with respect to the bit being read.

An MR head is typically combined with an inductive write head to form a piggyback MR head or a merged MR head. In either head the write head includes first and second pole pieces which have a gap at a head surface and are magnetically connected at a back gap. The difference between a piggyback MR head and a merged MR head is that the merged MR head employs the second shield layer of the read head as the first pole piece of the write head. A conductive coil induces magnetic flux into the pole pieces, the flux flinging across the gap and recording signals on a rotating disk. The write signals written by the write head are large magnetic fields compared to the read signals shielded by the first and second shield layers. Thus, during the write operation a large magnetic field is applied to one or more of the shield layers causing a dramatic rotation of the magnetic moment of the shield layer.

Magnetic recording data storage technologies, particularly magnetic disk drive technologies, have undergone enormous increases in stored data per unit area of media (areal data density). This has occurred primarily by reducing the size of the magnetic bit through a reduction in the size of the read and write heads and a reduction in the head-disk spacing.

Increasing head densities require read gap thickness values that are well below 1500 Å. During gap deposition, a gap layer is deposited on top of the lead layers and the MR element. However, the lead layers are significantly larger than the MR sensor. Since the lead layers are significantly larger than the MR sensor, most of the shorts are from the leads to the shields. Furthermore, the gap coverage at the edge of the leads is poor and the potential for shield-to-lead shorts for high density (thin gap) heads increase significantly.

It can be seen that there is a need for a method of providing improvement in the prevention of shield-to-lead shorts in MR/GMR heads.

SUMMARY OF THE INVENTION

To overcome the limitations in the prior art described above, and to overcome other limitations that will become apparent upon reading and understanding the present specification, the present invention discloses a method of providing improvement in the prevention of shield-to-lead shorts in MR/GMR heads.

The present invention solves the above-described problems by providing an insulation layer over the lead layer(s), which has a thickness independent of the gap layer.

A sensor in accordance with the principles of the present invention includes an MR sensor, a lead, the lead being electrically coupled to the MR sensor on opposite sides of the MR sensor and forming a single path to and from the MR sensor, an insulation layer only over the lead, and a gap layer formed over the MR sensor and the insulation layer, wherein the insulation layer has a thickness independent of the thickness of the gap layer.

Other embodiments of a system in accordance with the principles of the invention may include alternative or optional additional aspects. One such aspect of the present invention is that the lead further comprises a first lead portion electrically coupled to the MR sensor on opposite sides of the MR sensor and forming a single path to and from the MR sensor and a second lead portion, the second lead portion terminating at a distance from the MR sensor.

Another aspect of the present invention is that the insulator layer includes aluminum oxide, tantalum oxide, or a nitride composition.

Another aspect of the present invention is that the insulator layer includes a thickness in the range of substantially 100 to 500 angstroms.

Still another aspect of the present invention is that the first and second lead portions include gold, tantalum, or copper.

Another aspect of the present invention is that the first and second lead portions form a composite lead, the composite lead having a first thickness comprising only the first lead portion and a second thickness comprising the first and second lead portions, the first thickness located proximate the MR sensor, the second thickness being thicker than the first thickness and formed at a distance from the MR sensor.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method of providing improvement in the prevention of shield-to-lead shorts in MR/GMR heads.

Figure 1:
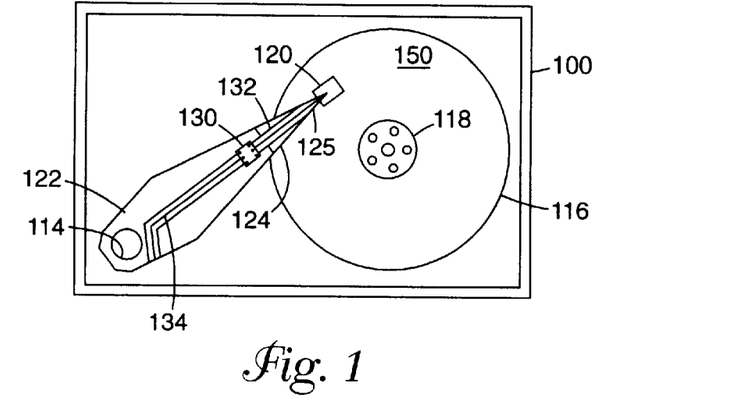
FIG. 1 illustrates a top view of the interior of a disk drive.

FIG. 1 illustrates a top view of the interior of a disk drive 100. In FIG. 1, the disk drive includes a suspension 124 that provides a force to the slider 120 to urge it toward the disk 116. The suspension may be a conventional type of suspension which are well-known in the art, e.g., a Watrous suspension, as described in U.S. Pat. No. 4,167,765 assigned to IBM. The suspension also provides a gimbaled attachment of the slider that allows the slider to pitch and roll as it rides on the air bearing. The data detected from disk 116 by the MR read head of transducer 125 is processed into a data readback signal by signal amplification and processing circuitry in the integrated circuit chip 130 located on arm 122. The signals from transducer 125 travel via flex cable 132 to chip 130, which sends its output signals via cable 134. The above description of a typical magnetic disk storage system, and the accompanying FIG. 1, are for representation purposes only. Typically a magnetic layer is formed on each side of the disk substrate and each side of the disk 116 may thus have one or more sliders associated with it. Also, disk drives may contain a number of disks and actuators, and each actuator may support a number of sliders.

Figure 2:
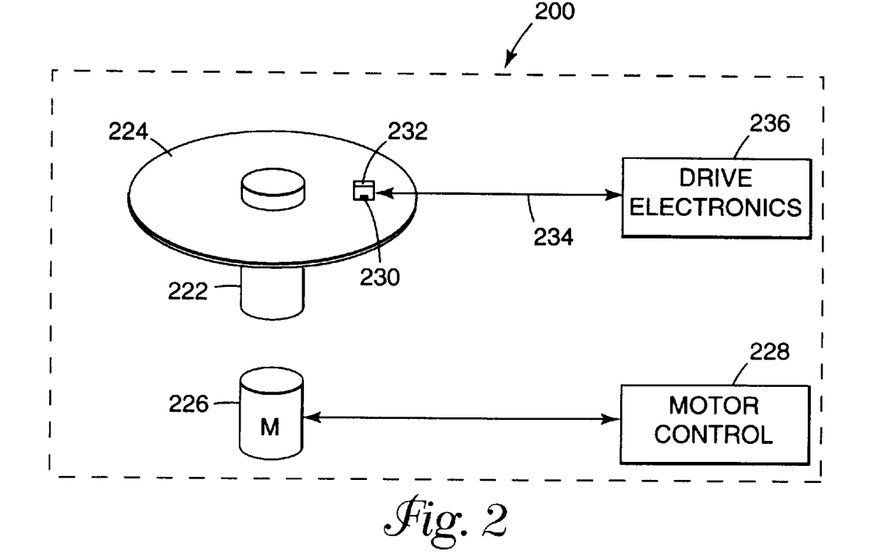
FIG. 2 illustrates a side view of a magnetic disk drive.

FIG. 2 illustrates a side view of a magnetic disk drive 200. The drive 200 includes a spindle 222 which supports and rotates a magnetic disk 224. The spindle 222 is rotated by a motor 226 which is controlled by drive controls 228. A magnetic head 230, which may be a merged MR head for recording and reading, is mounted on a slider 232 which in turn is supported by a suspension and actuator arm 234. The suspension and actuator arm 234 positions the slider 232 so that the magnetic head 230 is in a transducing relationship with a surface of the magnetic disk 224. When the disk 224 is rotated by the motor 226, air is moved by the surface of the disk, causing the slider to ride on a cushion of air (an air bearing) slightly above the surface, in the order of 0.075 microns. The magnetic head 230 is then employed for writing information to multiple circular tracks on the surface of the disk 224 as well as reading information therefrom. These information signals as well as servo signals for moving the slider to various tracks are processed by drive electronics 236.

Figure 3:
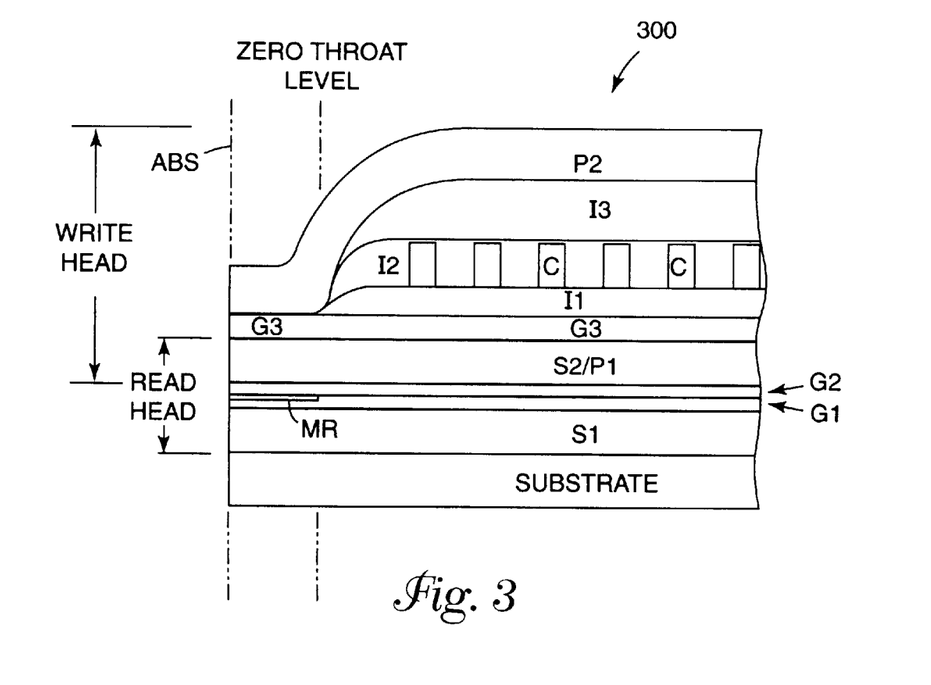
FIG. 3 is a side cross-sectional schematic illustration of the merged MR head.

FIG. 3 is a side cross-sectional schematic illustration of the merged MR head 300. The merged MR head 300 includes a read head portion and a write head portion which are lapped to an air beating surface (ABS), the air bearing surface being spaced from the surface of the rotating disk by the air bearing as discussed hereinabove. The read head portion includes an MR sensor which is sandwiched between first and second gaps layers G1 and G2 which, in turn, are sandwiched between first and second shield layers S1 and S2. The write head portion includes a coil layer C and insulation layer I2 which are sandwiched between insulation layers I1 and I3 which in turn are sandwiched between first and second pole pieces P1 and P2. A gap layer G3 is sandwiched between the first and second pole pieces at their pole tips adjacent the ABS for providing a magnetic gap. When signal current is conducted through the coil layer C, signal flux is induced into the first and second pole layers P1 and P2 causing signal fringe flux across the pole tips of the pole pieces at the ABS. This signal fringe flux is induced into circular tracks on the rotating disk 116, shown in FIG. 1, during a write operation. During a read operation, recorded magnetic flux signals on the rotating disk are induced into the MR sensor of the read head causing a change in the resistance of the MR sensor which can be sensed by a change in potential across the MR sensor responsive to a sense current (not shown) conducted through the MR sensor. These changes in potential are processed by the drive electronics 236 shown in FIG. 2. The combined head illustrated in FIG. 3 is a merged MR head in which the second shield layer S2 is employed as a first pole piece P1 for the combined head. In a piggyback head (not shown) the second shield layer S2 and the first pole piece P1 are separate layers.

Figure 4:
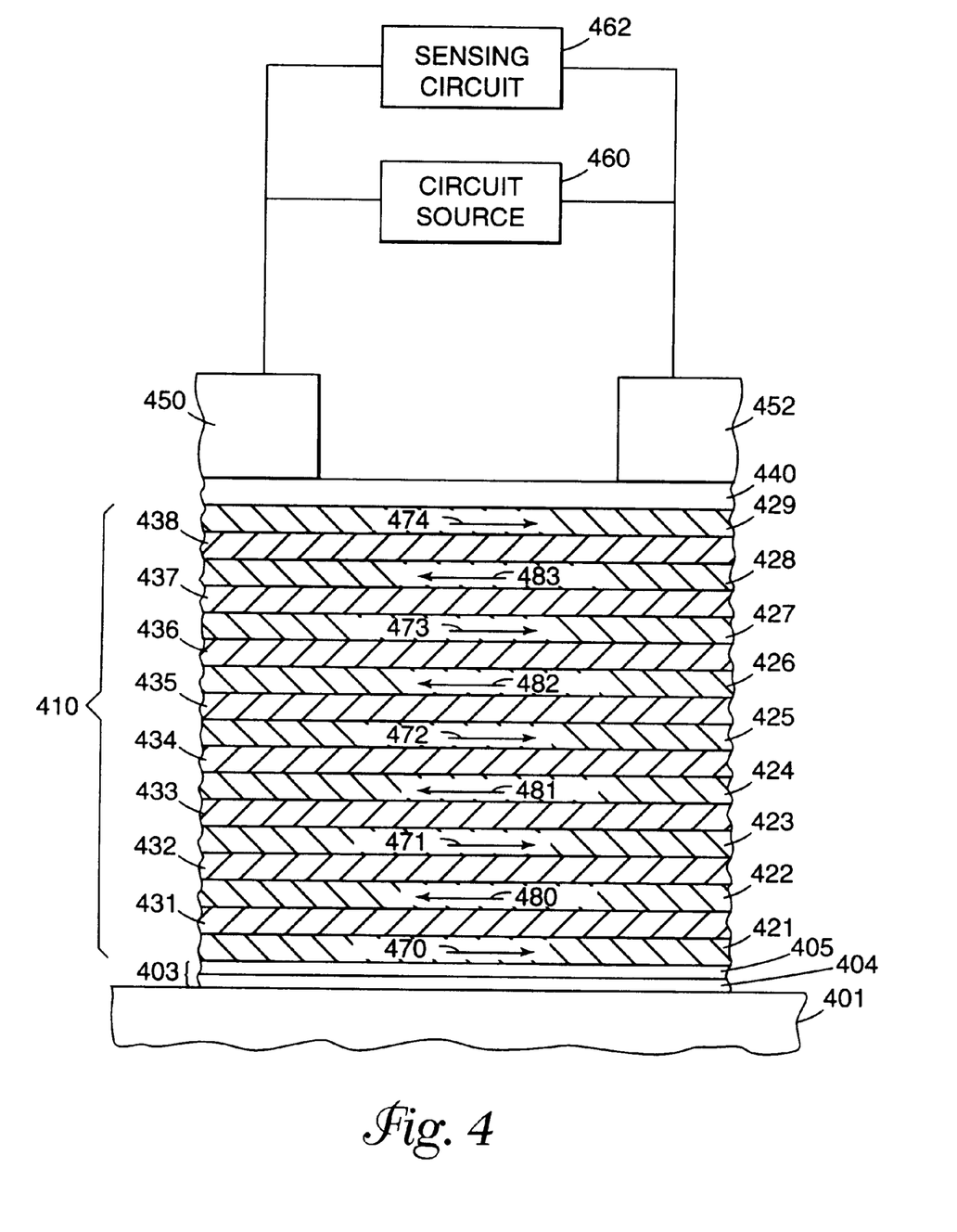
FIG. 4 shows a schematic sectional view of the digital GMR sensor.

FIG. 3 illustrates the overall physical arrangement of the layers used in forming a merged MR head 300. However, FIG. 3 does not show the leads to the MR sensor. As mentioned above, the leads required significantly larger area than the area required of the MR sensor. Furthermore, the gap coverage at the edge of the leads is poor and potential for shield-to-lead shorts for high density (thin gap) heads increase significantly. However, since most of the shorts are from the leads to the shields, the leads should be designed to prevent shield-to-lead shorts. FIG. 4 illustrates, with respect to GMR heads, how the leads are attached to the sensors.

FIG. 4 shows a schematic sectional view of the GMR sensor 400. The sensor includes a substrate 401, a seed layer 403 formed on the substrate 401 and a stack 410 of alternating ferromagnetic layers and nonferromagnetic metal spacer layers formed on seed layer 403. The stack 410 contains at least two lead layers and may contain three ferromagnetic layers if a biasing layer is used. The stack 410 also contains two nonferromagnetic layers. Thus, as will be explained later, the sensor can provide a three-level digital output centered about zero external magnetic field. However, in the embodiment of FIG. 4 there are nine magnetic layers, 421–429 separated by eight nonferromagnetic metal layers 431–438, in which case the sensor 400 will provide a nine-level digital output centered about zero external magnetic field. The sensor 400 includes a protective or capping layer 440 and electrical lead layers 450, 452. The lead layers 450, 452 provide electrical connection to a current source 460 and a signal sensing circuit 462. The top 429 or bottom 421 ferromagnetic layer may also have its magnetization fixed by a separate biasing layer (not shown).

The sensor's multilayer stack 410 is preferably formed from ferromagnetic layers 421–429 of cobalt (Co) or Permalloy (Ni sub x Fe sub 1–x, where x is approximately 0.81) and nonferromagnetic metallic spacer layers 431–438 of copper (Cu). Alternative ferromagnetic materials are binary and ternary alloys of Co, nickel (Ni) and iron (Fe) and alternative nonferromagnetic metals are silver (Ag), gold (Au) and alloys of Cu, Ag and Au. Such multilayer structures exhibit GMR in that the ferromagnetic layers are anti-ferromagnetically coupled across the spacer layers and the relative alignments of the magnetizations of the ferromagnetic layers vary in the presence of an external magnetic field. However, unlike the previously reported GMR structures, the multilayer stack 410 is fabricated such that it exhibits the property that each of the ferromagnetic layers 421–429 switches its magnetization orientation independently and individually at discrete external magnetic field levels.

In the present invention, the stack 410 is a crystalline multilayer grown in such a manner that each of the ferromagnetic layers 421–429 exhibits an intrinsic two-fold in-plane uniaxial magnetic anisotropy. This means that in the absence of an external magnetic field the crystalline structure of each ferromagnetic layer induces the magnetization to be aligned either parallel or anti-parallel to a single axis. Molecular beam epitaxy (MBE) can be used to prepare the crystalline multilayer. However, recently it has been shown that a crystalline multilayer can be formed by the simpler process of sputter deposition, as described for example by Harp and Parkin, Appl. Phys. Lett. 65 (24), 3063 (Dec. 12, 1994).

The substrate 401 is preferably a crystal of polished 110 magnesium oxide (MgO). The seed layer 403 includes a bilayer of an iron (Fe) film 404 and a platinum (Pt) film 405. The Fe film 403 is sputter deposited first to a thickness of approximately 5–10 Angstrom followed by sputter deposition of the Pt film 405 to a thickness of approximately 30–50 Angstrom. The Fe and Pt films are grown at approximately 500 degrees Celsius or higher to obtain the best multilayer crystallinity, i.e., to avoid significant interdiffusion of dissimilar metals in the structure. It is important to obtain an essentially single crystallographic orientation of the multilayer stack 410 since the uniaxial magnetic anisotropy of each of the ferromagnetic layers 421–429 reflects the crystallographic symmetry of the crystalline multilayer. In particular, for multilayers containing ferromagnetic layers of Permalloy or Co, oriented along the 110 direction, each of the ferromagnetic layers 421–429 exhibits a large in-plane uniaxial magnetic anisotropy.

As shown by arrows 470–474 and oppositely directed arrows 480–483, alternate ferromagnetic layers 421–429 have their magnetizations oriented anti-parallel in the absence of an external magnetic field. This anti-parallel alignment is due to the intrinsic uniaxial anisotropy and the anti-ferromagnetic coupling across the Cu spacer layers 431–438.

The uniaxial magnetic anisotropy of the multilayer stack 410 is consistent with the two-fold crystallographic symmetry of the 110 face. Other crystal faces with two-fold symmetries also give rise to an in-plane uniaxial magnetic anisotropy field. By taking advantage of this large in-plane magnetic anisotropy a multilayered structure can be fabricated for which each ferromagnetic layer in the structure switches its magnetization direction at a distinct external magnetic field level. For Co/Cu and Permalloy/Cu GMR multilayers, this results in a digital MR sensor based on the GMR effect that is capable of detecting and distinguishing external magnetic fields in different discrete field strength ranges. The number of ferromagnetic layers can be selected so that different numbers of field strength ranges can be detected.

Those skilled in the art will recognize that there are several ways of making the digital GMR sensor of the present invention, i.e., a multilayer GMR structure with ferromagnetic layers exhibiting uniaxial magnetic anisotropy wherein the ferromagnetic layers have different magnetic properties so that each ferromagnetic layer will switch its magnetic moment at different external magnetic fields.

Figure 5A:
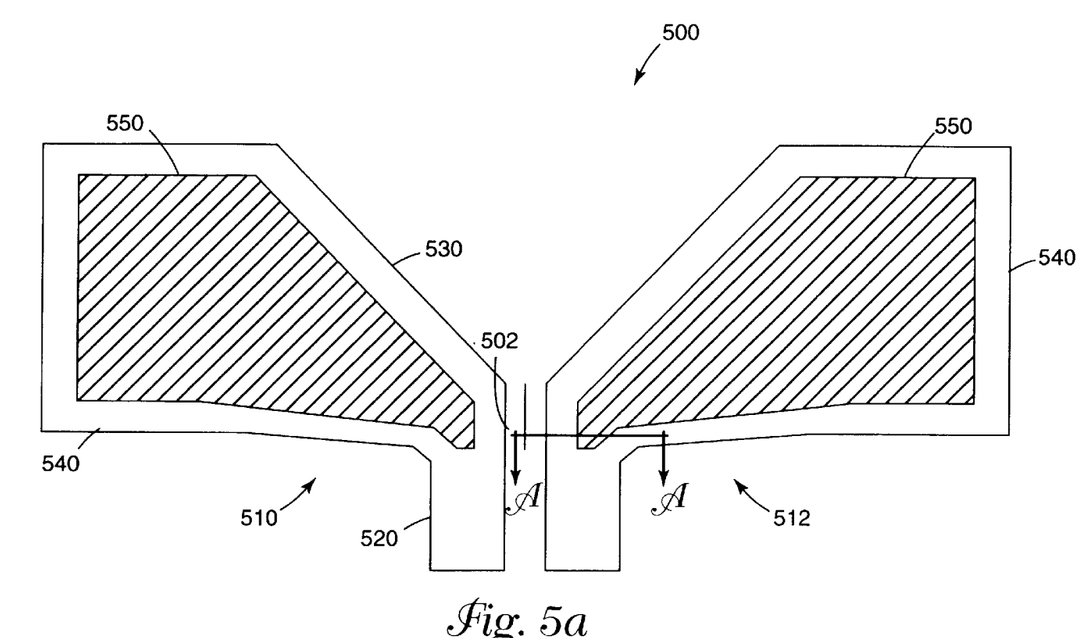
FIGS. 5a–c illustrate the layers of a sensor that provides greater resistance to shield-to-lead shorts according to the present invention.
Figure 5B:
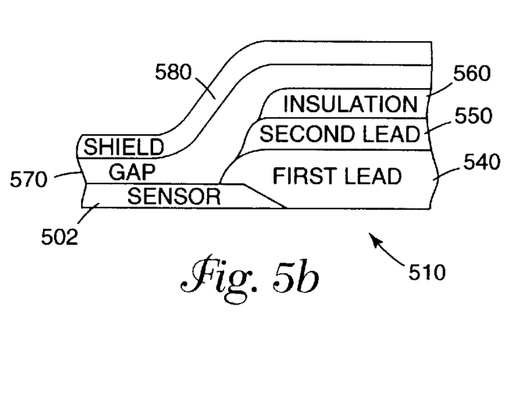
Figure 5C:
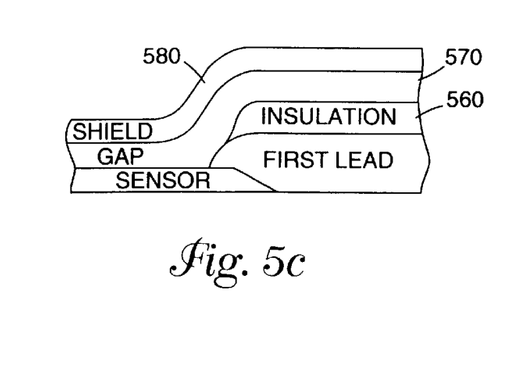

Nevertheless, the lead layers required significantly larger area than the area required of the MR or GMR sensor. For clarity, MR heads or MR sensors will be used hereafter to refer to both MR heads or MR sensors and GMR heads or GMR sensors. FIGS. 5a–c illustrates sensors 500 that provide greater protection against shield-to-lead shorts according to the present invention. In FIGS. 5a and 5b, an MR sensor 502 has lead layers 510, 512 attached to opposite sides. FIG. 5b is a cross-sectional view of FIG. 5a across A—A.

Referring to FIG. 5a now, recorded magnetic flux signals on t he rotating disk are induced into the MR sensor 502 of the read head during a read operation thereby causing a change in the resistance of the MR sensor 502, which can be sensed by a change in potential across the MR sensor 502 responsive to a sense current (not shown) conducted through the MR sensor 502 through lead layers 510, 512. Since the second gap is deposited over lead layers 510, 512 and the MR sensor 502, the lead layers 510, 512 must be thin near the gap region 520 over the sensor 502. To maintain this narrow gap thickness at the sensor 502, the lead layers 510, 512 are form ed with a expanding geometry: narrow near the gap 520 and expanded 530 as the lead layers 510, 512 move away from the gap region 520.

To optimize the area of the lead layers 510, 512 for resistivity and manufacturability, the lead layers 510, 512 may be formed by first depositing a first lead portion 540 to connect to the MR sensor 502. Then a second lead portion or sublayer 550 may be deposited only on the first lead portion 540.

Refer ring now to FIG. 5b, the first lead portion 540 is shown connected to the MR sensor 502. The second lead portion or sublayer 550 is then shown deposited only on the first lead portion 540 at a distance from the MR sensor 502. Since FIG. 5b is a cross-sectional view of FIG. 5a across A—A, only one lead layer is illustrated. To maintain the narrow gap thickness at the sensor, and to protect against shield-to-lead shorts, an insulation layer 560 (not shown in FIG. 5a) is formed over the second lead portion or sublayer 550. The gap layer 570 is formed over the MR sensor 502 and the insulation layer 560. The shield layer 580 is then formed over the gap layer 570. However, the insulation layer 560 has a thickness that is independent of the thickness of the gap layer 570 and thus the gap layer may be made thin while sufficient separation between the shield layer 580 and the second lead sublayer 550 to prevent shield-to-lead shorts.

FIG. 5c illustrates another embodiment of the present invention wherein a single lead layer 540 and an insulation layer 560 are formed. Those skilled in the art will recognize that a hard bias layer (not shown) may be formed once the MR sensor 502 is formed and before the formation of the lead sublayers 540, 550 so that the MR sensor 502 is stabilized.

Figure 6:
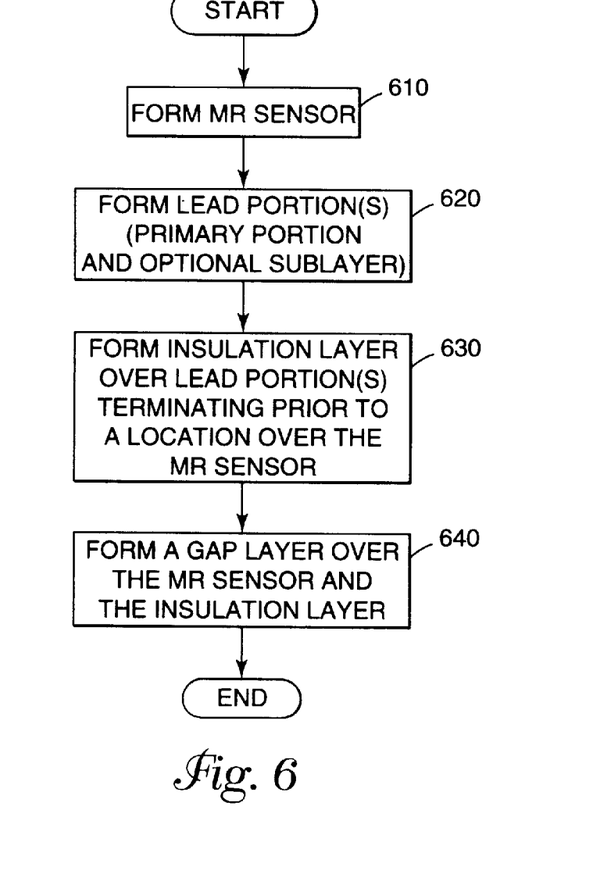
FIG. 6 is a flow chart for a method for improving the yield for shield-to-lead shorts between conductor leads and shields.

FIG. 6 is a flow chart 600 for a method for improving the yield for shield-to-lead shorts between conductor leads and shields. First the MR sensor is formed 610. Then a primary lead layer is formed 620 to provide the signal path for the sense current conducted through the MR sensor through leads. Optionally, a second lead portion or sublayer may be formed on the primary lead portion as shown in FIG. 5b. Then an insulation layer is formed on the primary lead layer 630 to provide additional insulation coverage to the lead. The insulation layer terminates at a location prior to the MR sensor and may include aluminum oxide, tantalum oxide, or nitrides of few hundred angstroms. Then, a gap layer is formed over the MR sensor and the insulation layer 640, wherein the thickness of the insulation layer is independent of the thickness of the gap layer.

Those skilled in the art will recognize that reactive deposition of the insulator layer can be done after leads or stitched leads deposition. For high density heads with gold leads (no stitched leads) a thin insulator layer (100–500A) can be deposited in the same system without exposing the water to atmosphere. Not only this will ensure the desirable lift -off but also it will eliminate a separate photo process step for the second gap fill deposition on top of leads. This process can be performed in a dual chamber IBSD system where one chamber is used for reactive insulator processing while the second chamber is used for leads deposition such as gold, tantalum, or copper. Moreover deposition flux incidence angle can be adjusted to enhance the insulator coverage of the lead edges.

The above described method is easy to implement with very little or no increase in cycle time. Further, the thickness of the insulator can be adjusted for the best result but even 100A in-situ deposited insulator coverage of the lead edges can improve the resistance to shield-to-lead shorts. Even thicker insulator films may be possible with chemical mechanical polishing of the second shield layer. As mentioned above, other benefits of this process is that it will allow optimization of the lead area for resistivity and manufacturability issues. Since this insulator deposition does not interfere with the second gap deposition, the read gap will still be defined with the first gap and the second gap deposition performed as usual.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of forming an MR head, comprising the steps of:

forming an MR element;

depositing a first lead layer, the lead layer being electrically and physically connected to the MR element and providing an electrical path to the MR element;

depositing a second lead layer over the first lead layer, the second lead layer terminating at a distance from the MR element such that no part of the second lead layer contacts the MR element and being electrically and physically connected with at least a portion of the first lead layer;

depositing an insulation layer over the full length of the second lead layer and only over the second lead layer; and depositing a gap layer over the MR element, at least a portion of the first lead layer, and the insulation layer, wherein the insulation layer has a thickness independent of the thickness of the gap layer.

2. The method of claim 1, wherein the first lead layer is electrically connected to the MR element on opposite sides of the MR element and forming a continuous junction to and from the MR element and the second lead layer.

3. The method of claim 1, wherein the depositing the insulation layer comprises depositing aluminum oxide, tantalum oxide, or a nitride composition.

4. The method of claim 1, wherein the first and second lead layers comprise gold, titanium, or copper.

5. The method of claim 1, wherein the depositing the insulation layer comprises depositing a thickness in the range of substantially 100 to 500 angstroms.

6. The method of claim 1, wherein the steps of depositing the first and second lead layers are performed in a first chamber and the step of depositing the insulation layer is performed in a second chamber.

7. The method of claim 6, wherein the first and second chambers comprise a first and second IBSD system.

8. The method of claim 1, wherein the first and second lead layers form a composite lead, the composite lead having a first thickness comprising only the first lead layer and a second thickness comprising the first and second lead layers, the first thickness located proximate the MR element, the second thickness being thicker than the first thickness and formed at a distance from the MR element.

9. An MR head, comprising:

an MR element;

a first lead layer, the lead layer being electrically and physically connected to the MR element and providing an electrical path to the MR element;

a second lead layer deposited over the first lead layer, the second lead layer terminating at a distance from the MR element such that no part of the second lead layer contacts the MR element and being electrically and physically connected with at least a portion of the first lead layer;

an insulation layer deposited over the full length of the second lead layer and only over the second lead layer; and a gap layer deposited over the MR element, at least a portion of the first lead layer, and the insulation layer, wherein the insulation layer has a thickness independent of the thickness of the gap layer.

10. The MR head of claim 9, wherein the first lead layer is electrically connected to the MR element on opposite sides of the MR element and forming a continuous junction to and from the MR element and the second lead layer.

11. The MR head of claim 9, wherein the insulation layer comprises aluminum oxide, tantalum oxide, or a nitride composition.

12. The MR head of claim 9, wherein the first and second lead layers comprise gold, titanium, or copper.

13. The MR head of claim 9 wherein the insulation layer comprises a thickness in the range of substantially 100 to 500 angstroms.

14. The MR head of claim 9, wherein the steps of depositing the first and second lead layers are performed in a first chamber and the step of depositing the insulation layer is performed in a second chamber.

15. The MR head of claim 14, wherein the first and second chambers comprise a first and second IBSD system.

16. The MR head of claim 9, wherein the first and second lead layers form a composite lead, the composite lead having a first thickness comprising only the first lead layer and a second thickness comprising the first and second lead layers, the first thickness located proximate the MR element, the second thickness being thicker than the first thickness and formed at a distance from the MR element.

17. A disk drive, comprising:
a magnetic storage media;
a spindle, coupled to the magnetic storage media, for supporting and rotating the magnetic storage media;
a motor, coupled to the spindle, for rotating the magnetic storage media;
a magnetic head, in a transducing relationship with a surface of the magnetic storage media, for read and writing signals on the magnetic storage media; and
drive electronics, electrically coupled to the magnetic head, for processing the signal read and written on the magnetic storage media;
wherein the magnetic head further comprises:
an MR element;
a first lead layer, the lead layer being electrically and physically connected to the MR element and providing an electrical path to the MR element;
a second lead layer deposited over the first lead layer, the second lead layer terminating at a distance from the MR element such that no part of the second lead layer contacts the MR element and being electrically and physically connected with at least a portion of the first lead layer;
an insulation layer deposited over the full length of the second lead layer and only over the second lead layer; and
a gap layer deposited over the MR element, at least a portion of the first lead layer, and the insulation layer, wherein the insulation layer has a thickness independent of the thickness of the gap layer.

18. The disk drive of claim 17, wherein the first lead layer is electrically connected to the MR element on opposite sides of the MR element and forming a continuous junction to and from the MR element and the second lead layer.

19. The disk drive of claim 17, wherein the insulation layer comprises aluminum oxide, tantalum oxide, or a nitride composition.

20. The disk drive of claim 17, wherein the insulation layer comprises a thickness in the range of substantially 100 to 500 angstroms.

21. The disk drive of claim 17, wherein the first and second lead layers form a composite lead, the composite lead having a first thickness comprising only the first lead layer and a second thickness comprising the first and second lead layers, the first thickness located proximate the MR element, the second thickness being thicker than the first thickness and formed at a distance from the MR element.

* * * * *

UNITED STATES PATENT AND TRADEMARK OFFICE
CERTIFICATE OF CORRECTION

PATENT NO.   : 6,160,687
DATED        : December 12, 2000
INVENTOR(S)  : Pinarbasi It is certified that error appears in the above-identified patent and that said Letters Patent is hereby corrected as shown below:

Column 4,
Line 36, replace "beating" with -- bearing --.

Signed and Sealed this

Thirtieth Day of July, 2002

*Attest:*

*Attesting Officer*

JAMES E. ROGAN
*Director of the United States Patent and Trademark Office*